(12) United States Patent
De La Azuela et al.

(10) Patent No.: US 7,850,846 B2
(45) Date of Patent: Dec. 14, 2010

(54) FUEL FILTER

(75) Inventors: Julian De La Azuela, Madrid (ES); Juergen Gruen, Partenstein (DE); Nestor Rodriguez-Amaya, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 280 days.

(21) Appl. No.: 10/540,943

(22) PCT Filed: Nov. 20, 2003

(86) PCT No.: PCT/DE03/03842

§ 371 (c)(1),
(2), (4) Date: Mar. 23, 2006

(87) PCT Pub. No.: WO2004/061289

PCT Pub. Date: Jul. 22, 2004

(65) Prior Publication Data

US 2006/0207924 A1    Sep. 21, 2006

(30) Foreign Application Priority Data

Dec. 30, 2002  (DE) .............................. 102 61 742
Oct. 30, 2003  (DE) .............................. 103 50 781

(51) Int. Cl.
*B01D 17/02* (2006.01)
*B01D 36/04* (2006.01)
*B01D 35/16* (2006.01)
*B01D 35/157* (2006.01)
*B01D 35/02* (2006.01)
*F02M 37/22* (2006.01)

(52) U.S. Cl. ....................... 210/295; 210/313; 210/114; 210/123; 210/248; 210/266

(58) Field of Classification Search ................ 210/295, 210/313, 266, 114, 123, 248
See application file for complete search history.

(56) References Cited

U.S. PATENT DOCUMENTS

| | | | | |
|---|---|---|---|---|
| 2,864,505 A | * | 12/1958 | Kasten ....................... | 210/315 |
| 3,312,350 A | | 4/1967 | Kasten | |
| 3,368,681 A | * | 2/1968 | Kasten ....................... | 210/114 |
| 3,508,658 A | * | 4/1970 | McVay ....................... | 210/114 |
| 3,685,655 A | * | 8/1972 | Muller ....................... | 210/114 |
| 3,868,321 A | * | 2/1975 | Gough ........................ | 210/86 |
| 4,264,442 A | * | 4/1981 | Jackson ...................... | 210/86 |
| 4,334,989 A | * | 6/1982 | Hall .......................... | 210/114 |
| 4,491,143 A | * | 1/1985 | Yasuhara .................... | 137/172 |
| 4,539,109 A | * | 9/1985 | Davis ......................... | 210/104 |
| 5,366,520 A | * | 11/1994 | Tiemeyer .................... | 44/629 |
| 5,534,161 A | * | 7/1996 | Tarr et al. .................... | 210/744 |

(Continued)

FOREIGN PATENT DOCUMENTS

DE          197 37 264 A1    3/1999

(Continued)

*Primary Examiner*—Thomas M Lithgow
(74) *Attorney, Agent, or Firm*—Ronald E. Greigg

(57) ABSTRACT

The invention relates to a structurally simple and hence economical fuel filter, in particular a diesel filter, having at least one fuel inlet, at least one fuel outlet, water separator means, at least one sump, a water outlet associated with the sump, and control means for the water outlet, in which the water to be drained out is cleaned by means for separating out contaminants, so that this water can be given off to the environment.

13 Claims, 3 Drawing Sheets

U.S. PATENT DOCUMENTS

| | | |
|---|---|---|
| 5,879,543 A * | 3/1999 | Amini .................... 210/86 |
| 5,951,862 A * | 9/1999 | Bradford ................ 210/305 |
| 6,444,121 B1 * | 9/2002 | Maxwell ................ 210/172.1 |
| 6,881,328 B2 * | 4/2005 | Dittmann et al. .......... 210/86 |
| 6,893,571 B2 * | 5/2005 | Harenbrock et al. ...... 210/670 |
| 2002/0117435 A1 | 8/2002 | Pank |
| 2003/0121860 A1 * | 7/2003 | Harenbrock et al. ...... 210/660 |

FOREIGN PATENT DOCUMENTS

| | | |
|---|---|---|
| EP | 1 126 158 A2 | 8/2001 |
| FR | 1.440.976 | 6/1966 |
| FR | 2.179.359 | 11/1973 |
| JP | 61-234909 A * | 10/1986 |
| JP | 63258606 A * | 10/1988 |

* cited by examiner

FUEL FILTER

CROSS-REFERENCE TO RELATED APPLICATIONS

This application is a 35 USC 371 application of PCT/DE 03/003842 filed on Nov. 20, 2003.

BACKGROUND OF THE INVENTION

1. Field of the Invention

The invention relates to a fuel filter, in particular a diesel filter, having at least one fuel inlet, at least one fuel outlet, water separator means, at least one sump, a water outlet associated with the sump, and control means for the water outlet.

2. Description of the Prior Art

Fuel filters of the type with which this invention is concerned are used, among other places, in diesel engines for filtering out contaminants contained in diesel fuel and for separating water from the diesel fuel, in order to avoid problems and damage caused thereby, such as contamination or corrosion in the fuel system or poorer combustion in the engine.

One problem of the known fuel filters is carrying the water out of the sump, since after being separated out of the fuel, the water as a rule contains contaminants and therefore must not be given off to the environment without further treatment.

U.S. Pat. No. 4,264,442 discloses a fuel filter having a chamber in which there is a cage defining a fuel inlet chamber which communicates with the fuel inlet, and a fuel outlet chamber located diametrically opposite the fuel inlet chamber and separated from it by a partition, and which communicates with the fuel outlet. The fuel entering the fuel filter via the fuel inlet passes through the fuel inlet chamber, emerges from it via a porous wall into the chamber, circles the cage, then on the opposite side of the cage, via an equally porous wall, it enters the fuel outlet chamber, and from there, via the fuel outlet, it flows out of the fuel filter, as cleaned fuel. The bottom of the chamber outside the cage acts as a sump for water that has been separated out in the filtration. On the bottom of the sump there is a valve, which is controlled with the aid of a water level sensor located in the sump and with which a water outlet, communicating with a line, can be selectively opened and closed. If via the sensor it is ascertained that a certain quantity of water has accumulated in the sump, then the valve is opened, via a negative pressure generated at the water outlet, and a substantial portion of the water is exhausted from the sump by suction and carried away to a downstream chamber via the line.

A substantial disadvantage in carrying water out into such a chamber outside the fuel filter is that the chamber for catching the water must be emptied manually, and in this respect the fuel filter is not maintenance-free.

This disadvantage does not apply to a fuel filter system known from U.S. Pat. No. 4,637,351, which is refined compared to the system known from U.S. Pat. No. 4,264,442 in that the water outlet communicates, via various lines and chambers, with the air intake and exhaust system of the engine and in that way is subjected to a negative pressure. If the water level sensor ascertains a certainty quantity of water in the sump of the fuel filter, then the valve is opened via an electromagnet, so that the water accumulated in the sump is exhausted by suction because of the negative pressure and is delivered to the air intake and exhaust system. The result is that the water drained away evaporates, either upon combustion or at the tailpipe.

Although in this system the water is disposed of directly via the engine, there is nevertheless the disadvantage that connecting the fuel filter water outlet to the engine is complicated and hence expensive. Moreover, on delivering the water into the air intake system of the engine, there is the disadvantage that the combustion air, during the dewatering of the fuel filter, is substantially more humid, which impairs combustion, at least briefly.

OBJECTS AND ADVANTAGES OF THE INVENTION

It is the object of the present invention to make a fuel filter available that does not have the disadvantages discussed above, and in particular in terms of carrying away water can be operated essentially independently of other engine parts and is maintenance-free. The fuel filter should also be constructed simply and thus be favorable in terms of its manufacture.

This object is attained, in a fuel filter of the type defined at the outset, by means for separating out contaminants from the water to be drained off.

Surprisingly, it has been found that the contaminants can be separated out of the water comparatively simply, making it possible to carry the water away automatically, directly to the environment. All that must be assured is that only water separated from contaminants, but no fuel, is carried away via the water outlet, and this can easily be done by way of a suitable setting of the control means.

Many advantages are thus attained, compared to the known fuel filter systems described above. First, manually emptying or replacing filled water chambers is unnecessary, which simplifies maintenance of the fuel supply system. At the same time, a complicated line arrangement for connecting the water outlet to the air intake and exhaust system can be dispensed with. In contrast, the invention makes disposal of the separated-out water possible in a way that is independent of other engine parts. As a result, both maintenance costs and production and assembly costs for a fuel system that requires a fuel filter of the type defined at the outset can be reduced substantially.

In an extremely simple embodiment of the invention, unlike the fuel filters known before and described at the outset, the sump is associated with the clean side of the filter. The water contained in the fuel can be precipitated out, for instance by way of a suitable coating on the clean side of the filter. Depending on the embodiment, an arrangement in which the sump is associated with the dirty side of the filter may be as effective, or even more effective. In that case, the water is separated out for instance with the aid of a coating provided on the dirty side of the filter.

Given suitable filter material and/or a suitable coating, the separated-out water that has accumulated in the sump is so clean that it can be released directly to the environment. In that case, the means for separating contaminants out of the water to be released can be made available directly by way of the filter.

Regardless of whether the sump is located on the clean side or the dirty side of the filter, a filter, in particular an activated charcoal filter, for filtering the water to be released from the sump may be provided as the means for separating out contaminants from the water. This additional filter may for instance be located directly at the water outlet of the fuel filter, or in or at a water chamber downstream of the sump, into which chamber the water from the sump is released. In each case, by means of a suitable filter, it can be assured that the water given off to the environment is sufficiently clean.

In another preferred embodiment of the invention, a water absorption and evaporation unit downstream of the water outlet and open to the environment is provided as the separation means. Surprisingly, it has been found that the water to be released can be separated from contaminants simply and without additional complicated technical means by means of evaporation and can thus be released to the environment and disposed of without problems. In this embodiment, it must be assured that water that has not yet evaporated is trapped in place in such a way that it does not run off into regions where for environmental, safety or other reasons it must not be allowed to go.

For evaporating the accumulated water, the water outlet of the fuel filter is opened until a large proportion of the water accumulated in the sump, or nearly all the water, has run off and been received in the water absorption and evaporation unit; the water outlet is closed again quickly enough that no fuel is released from the sump. The intervals at which the fuel filter must be emptied are as a rule long enough that until the next time water is released from the sump, the previous quantity of released water can evaporate entirely.

Even if it is unnecessary, under normal ambient conditions and with suitable dimensioning of the water absorption and evaporation unit, to speed up the evaporation, for instance by a purposeful delivery of heat, conditions that speed up the evaporation do exist, especially in an engine compartment of a motor vehicle. For instance, the evaporation can be speeded up by the waste heat from the engine or, given purposeful positioning of the water absorption and evaporation unit in the engine compartment, it can be speeded up intentionally. Moreover, the evaporation can be speeded up by an air stream that is the result of relative wind, or by way of forced ventilation of the engine compartment. Another possible way of speeding up the evaporation is to provide an independent heat supply in the water absorption and evaporation unit, such as an electrically operated heating coil, although in that case an electrical energy supply is needed. Alternatively, the water absorption and evaporation unit may be supplied with heat via the engine cooling system, for instance.

In a preferred simple embodiment, the water absorption and evaporation unit has a container that is open in an upper region to the environment, preferably made of a temperature-resistant material, such as polyamide. The inflow for the water drained from the fuel filter can be effected for instance via the opening in the upper region of the container, or for instance also via a line on the side or optionally also on the bottom of the container. The opening on the top side of the container can be provided with a fine-mesh covering, by which the water contained in the container is prevented from splashing out. Thus the container acts as a kind of collection basin, from which the water drained from the fuel filter cannot flow out but nevertheless can be evaporated to the environment. The larger the cross section of the container in the region where the water is trapped, the larger is the available water surface area for the evaporation.

In a further preferred feature, the water absorption and evaporation unit has an absorbent material, which in particular at least partly comprises an absorbent paper and/or is spongelike, and which absorbs water, carried away from the sump of the fuel filter, and holds it until the water has evaporated completely. Depending on the absorbency of the material, it may simply be placed at the water outlet of the fuel filter, without any particular container for it. To prevent the water from dripping out of the absorbent material, however, the material may be located inside a container that then serves as a drip guard. The absorbent material in this embodiment then simultaneously offers protection against the water's splashing out of the container.

It is fundamentally advantageous if the water absorption and evaporation unit provides the largest possible evaporation surface area for the water. In this respect, the absorbent material preferably has a large surface area. This can be achieved for instance in a spongelike material by means of a riblike structure toward the environment, similar to cooling fins of a heat sink for electronic components.

In another preferred embodiment of the invention, as the means for separating contaminants out of the water to be drained off, chemicals for binding the contaminants are provided, which are stored either already in the sump and/or in a chamber downstream of the water outlet.

For the water outlet, various preferred closing systems exist, depending on the location of the fuel filter in the fuel line system.

For instance, in an arrangement in which there is overpressure at the fuel inlet compared to the fuel outlet and compared to the water outlet, such as whenever the fuel filter in the fuel system is downstream of a fuel pump, a controllable valve is preferably provided at the water outlet. Because then the overpressure, relative to the environment, that exists in the fuel filter, the water is automatically forced out of the sump when the valve opens.

A valve for closing the water outlet can be actuated mechanically via a floating body, without requiring electrical water sensors or other electrical components for releasing the water. Once a maximum water level is exceeded, the floating body, located at the phase boundary between the fuel and water, lifts a valve, so that water is released, and it closes the valve again when a minimum water level is reached or undershot, depending on the type of embodiment.

Conversely, if a negative pressure prevails at the fuel outlet compared to the fuel inlet and the water outlet, for instance whenever the fuel filter in the fuel system is located upstream of a fuel pump, a pump is preferably provided at the water outlet. The pump is necessary in order to carry the water out of the sump, counter to the negative pressure that prevails in the fuel filter relative to the environment. In an advantageous feature, a volumetric pump is used as a pump; compared to other pumps, it has the advantage that with it a clearly defined quantity of water can be carried out of the sump, making it possible to assure that—beginning at a maximum water level—just enough water that no fuel is released via the water outlet is carried away. In this respect, the use of a pump, in particular a volumetric pump, is advantageous even if an overpressure prevails in the fuel filter relative to the environment.

The valve or pump can be controlled via water level sensors located in the sump. Particularly if a volumetric pump is used, it suffices to use only one water level sensor in the sump, which displays when a defined water level is reached or has been exceeded, since thereupon a precisely defined quantity of water can be carried out of the sump via the volumetric pump. But even without a volumetric pump, a single water level sensor can suffice for controlling the valve or the pump, for example whenever the controller specifies a defined time for which the valve is to be opened, or the pump actuated, after the specific water level is reached.

If in another preferred embodiment two water level sensors are used, with which an upper and a lower filling quantity of water in the sump can be ascertained, then the opening and closing of the valve, or the switching on and off of the pump, can be controlled entirely via the signals of the two sensors.

BRIEF DESCRIPTION OF THE DRAWINGS

The invention is described in further detail below, with reference to the drawings, in which.

DESCRIPTION OF THE PREFERRED EMBODIMENTS

Figure 1:
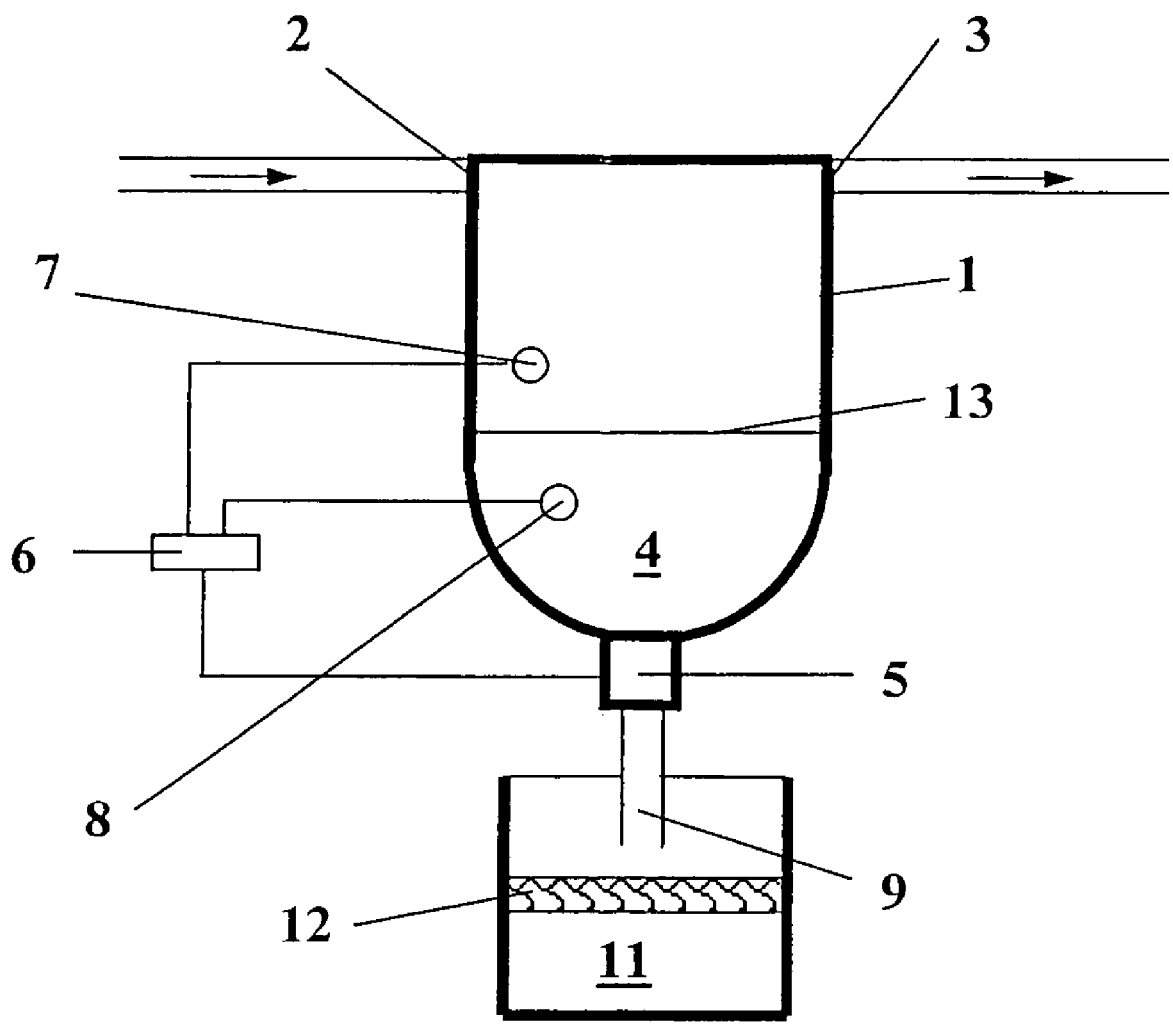
FIG. 1 is a schematic view, in section, of a preferred exemplary embodiment of a fuel filter according to the invention.

In FIG. 1, a fuel filter is shown schematically, with a housing 1 on whose upper side wall a fuel inlet 2 and a fuel outlet 3 are provided on diametrically opposite sides. It is quite familiar to one skilled in the art how a filter for filtering the fuel can be located in a fuel filter housing, and what water separator means should be provided. Illustrating the location of the filter in the fuel filter housing and illustrating the means for separating water from the fuel have therefore been dispensed with, for the sake of simplification. The lower region of the housing 1 serves as a sump 4 for water that is precipitated out in the filtration of the fuel. A water outlet 5 with a controllable closure is provided on the bottom of the sump 4. The water outlet is controlled via a control unit 6 as a function of the fill level signals of an upper water level sensor 7 and a lower water level sensor 8. A vertical line 9 is disposed on the underside of the closure.

The line 9 ends in a container 11, located below the housing 1, that is open toward the top. An absorbent material 12 for absorbing water carried away from the sump 4 is located in the interior of the container and extends horizontally over the entire internal cavity of the container 11. The absorbent material may for instance at least partly comprise a sponge, an absorbent paper, or a nonwoven fabric.

The water outlet, or closure, in a simple version, may be embodied as a valve, if the pressure on the bottom of the sump is greater than the ambient pressure, so that the water can simply run out of the sump when the valve is open. This is the case in particular whenever the fuel filter is located downstream, in the fuel flow direction, of a fuel pump. If the pressure on the bottom of the sump is less than the ambient pressure, then there must be a pump at the closure 5, so that the water can be pumped out of the sump 4 counter to the pressure difference.

Via the control unit 6, the valve is opened or the pump actuated, when the water level in the sump 4 of the fuel filter, represented by the line 13, has reached the upper water level sensor 7. Conversely, via the control unit 6, the valve is closed or the pump is switched off when the water level 13 has reached or dropped below the lower water level sensor 8.

In principle, it is possible to dispense with the lower water level sensor 8. Instead, the control unit 6 can ascertain the time for closing the valve or shutting off the pump on the basis of a time constant, which can be based for instance on empirical data on the outflow speed of the water out of the sump 4. Or, a clearly defined quantity of the water is carried away, which is possible for instance if a volumetric pump is used.

The water is drained into the container 11, and from there it is absorbed by the absorbent material 12. If so much water is drained from the sump 4 that it cannot be completely absorbed by the absorbent material, then the excess water can drip downward and accumulate on the container bottom. The absorbent material 12 offers protection against splashing out of the water accumulated on the bottom of the container 11, so that pollution of the environment from oil residues or dirt particles dissolved in the water is reliably avoided.

Given suitable dimensioning of the absorbent material, in the period of time available for evaporation between the times when water is released from the sump of the fuel filter, the water can evaporate completely into the environment. The evaporation is reinforced as a rule by an elevated ambient temperature, resulting from the waste heat from the engine.

Figure 2:
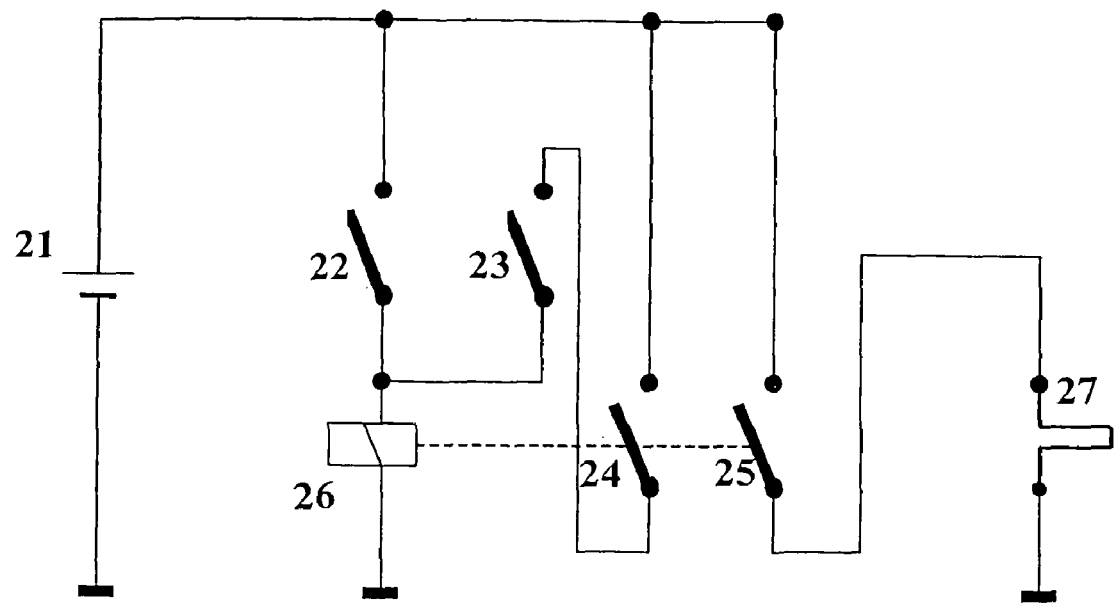
FIG. 2, a circuit arrangement for controlling the water outlet of a preferred embodiment of the invention.

In FIG. 2, a preferred circuit arrangement is shown for controlling the water outlet, with an upper water level sensor and a lower water level sensor. It has a voltage source 21, four switches 22, 23, 24, 25, a relay 26, and a signal transducer 27. The first switch 22 is switched by an upper water sensor and the second switch 23 is switched by a lower water sensor. The third switch 24 and the fourth switch 25 are switched by the relay 26. When the fourth switch 25 has been switched on, the signal transducer 27 is connected to the voltage source, and the second and third switches 23, 24 are connected in series and are parallel to the first switch 22. Switching on the first switch 22 and/or the second and third switches 23, 24 causes the relay 26 to be connected to the voltage source 21.

As long as the water level has not yet undershot the lower water level sensor, or in other words a minimum water level has not been undershot, the second switch 23 remains on. The first switch 22 is switched on whenever the water level has reached the upper water level sensor, or in other words when a maximum water level is reached or has been exceeded. With the closure of the first switch 22, the relay 26 is connected to the voltage source 21 and is thereby switched. As a result, the third and fourth switches 24, 25 are short-circuited, so that the signal transducer 27 is connected to the voltage source 21 and outputs a signal for opening the water outlet, for instance for opening a valve or actuating a pump, and water can run out of the sump of the fuel filter. As soon as the maximum water level is undershot, the first switch 22 is opened again. However, this has no influence on the switching status of the relay 26, because it remains connected to the voltage source 21 via the second and third switches 23, 24, which are both still closed. Not until the water level has fallen below the lower water sensor and thus the minimum water level is the second switch 23 opened again. As a result, the supply of current to the relay 26 is interrupted, so that it switches over, and the third and fourth switches 24, 25 are opened again. As a result, the signal transducer 27 is disconnected from the voltage source 21, so that the signal level changes, and the water outlet is closed.

Figure 3:
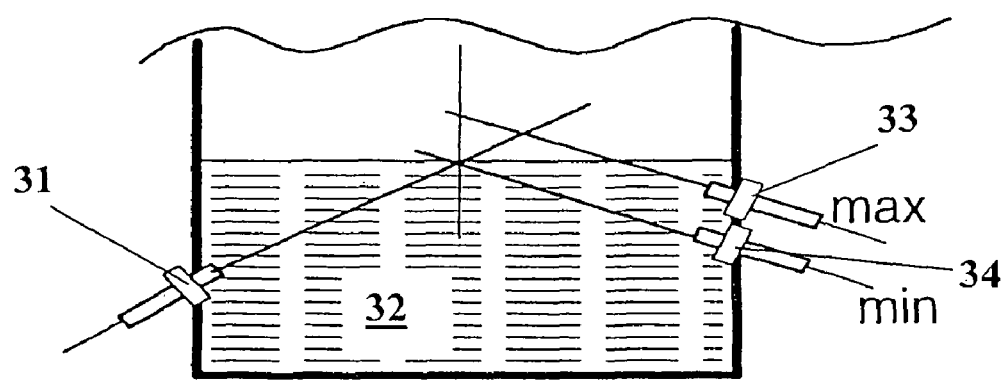
FIG. 3, a simplified illustration of an exemplary embodiment for a fill level sensor in cross section.

In FIG. 3, another preferred variant of a water sensor system for determining the attainment of a maximum water level and a minimum water level is shown. The water sensor system comprises a laser 31, which is located on one side of the sump 32 and is oriented obliquely upward. The laser 31 is preferably oriented such that its beam intersects a predetermined level, as the minimum water level, in the middle of the sump. On the diametrically opposite side of the sump, two light sensors 33, 34 are located one above the other; the first light sensor 33 is oriented such that the laser beam, reflected from the phase edge between the fuel and the water, when the water level is at a minimum, strikes the sensor face, and the second light sensor 34 is oriented such that the laser beam reflected from the phase edge, when the water level is maximum, strikes its sensor face. The other components of the fuel filter, such as the water outlet and so forth, are not shown, for the sake of simplicity. A water sensor system of this kind is especially suitable for fuel systems in fixedly installed, immovable combustion apparatuses.

Figure 4:
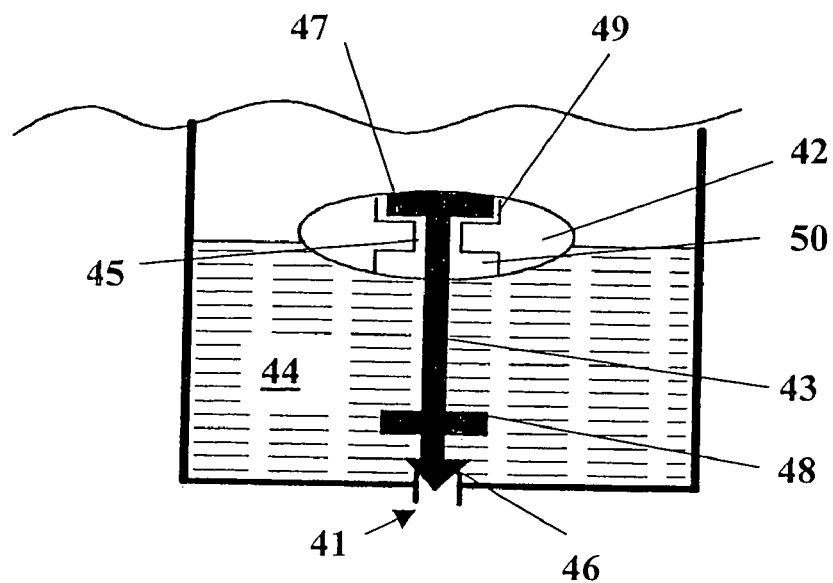
FIG. 4, a float-controlled water outlet in a simplified illustration in cross section.

In FIG. 4, the principle of a float controller for opening the water outlet 41 at a maximum water level and closing the water outlet 41 at a minimum water level is illustrated. A floating body 42, which is embodied such that it floats on the aqueous phase but is heavier than the fuel, cooperates with a valve pin 43 in such a way that it lifts the valve pin 43 as soon as a defined maximum water level in the sump 44 is exceeded, and it lowers the valve pin 43 again as soon as a defined minimum water level is undershot. The valve pin 43 is guided by a through opening 45 in the floating body 42. On its upper end and in its lower region, somewhat above its valve cone 46 that closes the water outlet 41, it has encompassing ribs 47, 48, acting as drivers, which cooperate with corresponding recesses 49, 50 on the top and underside of the floating body 42. If the floating body 42 exceeds the maximum water level, the valve pin 43 is lifted, so that the water outlet 41 is opened. The valve pin 43 then remains in its raised position until enough water has been drained from the sump that the floating body, dropping along with the water level, presses the valve pin 43 downward, so that once the minimum water level is reached, the water outlet 41 is closed again. A guidance mechanism for the valve pin 43 is not shown, for the sake of simplicity.

Figure 5:
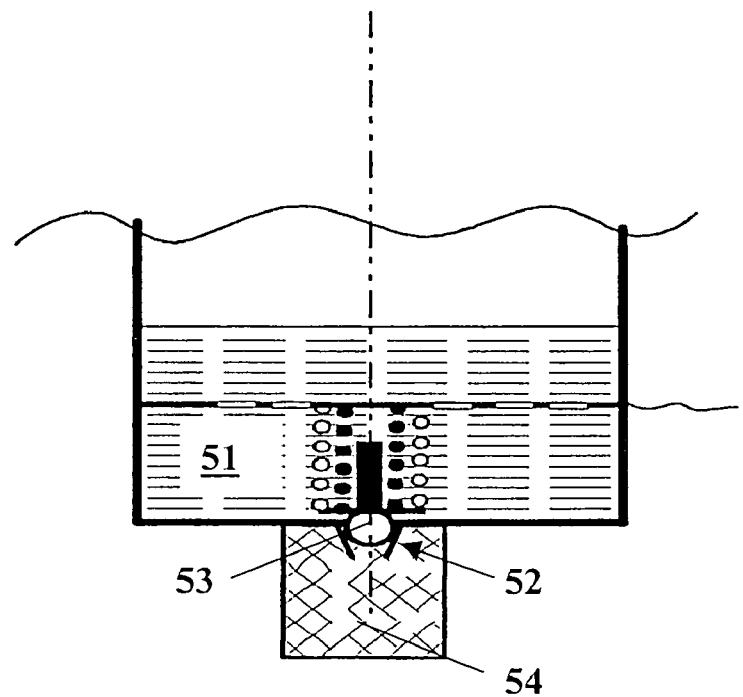
FIG. 5, the principle of a preferred exemplary embodiment for a water outlet, in a simplified illustration in cross section.

In FIG. 5, the sump 51 of a fuel filter is shown, with a water outlet 52 which can be opened and closed via an electromagnetically closable valve 53, and which is adjoined by a filter body 54, by which the water drained from the sump 51 is cleaned, so that it can be released directly to the environment. The filter body 54 may also be embodied as a sponge, which traps the water, so that it can evaporate into the environment. In both cases, contaminants contained in the drained-off water stay in the filter body 54.

Many further features for controlling the water outlet or the means for separating contaminants from the water to be drained off or that has been drained off are possible. For instance, as means for controlling the water outlet, final control elements such as bimetallic or memory metal elements can be used, which for instance lift the valve cone counter to a spring force when the water outlet is to be opened. Alternatively, a floating body may be used that cooperates not directly with a valve pin but rather cooperates with a valve pin via a lever mechanism. Filters for cleaning the water to be drained off or that has been drained off that have a system for evaporating the then-cleaned water, or a system for binding contaminants by means of chemicals or catalysts, may also be selectively combined with one another.

The foregoing relates to preferred exemplary embodiment of the invention, it being understood that other variants and embodiments thereof are possible within the spirit and scope of the invention, the latter being defined by the appended claims.

The invention claimed is:

1. A fuel filter comprising
a filter housing,
at least one fuel inlet (2) provided on the filter housing,
at least one fuel outlet (3) provided on the filter housing,
an element located in the filter housing which separates water from the fuel,
at least one sump (51) located in the filter housing for collecting the water separated from the fuel,
a water outlet (52) provided on the filter housing through which water drains from the sump,
a valve (53) which opens and closes the water outlet (52), and
means mounted on the fuel filter downstream of the water outlet for separating contaminants from water which has been drained from the sump, said means for separating contaminants from water which has been drained from the sump being located inside a container and the container is mounted directly to the filter housing such that the container and filter housing are in direct contact with each other.

2. The fuel filter according to claim 1, wherein said element includes a filter element which also cleans contaminants from the fuel and wherein the sump is associated with a clean side of the filter element.

3. The fuel filter according to claim 1, wherein said element includes a filter element which also cleans contaminants from the fuel and wherein the sump is associated with a dirty side of the filter element.

4. The fuel filter according to claim 1, wherein the means mounted on the fuel filter downstream of the water outlet for separating contaminants from water which has been drained from the sump comprises an activated charcoal filter (54).

5. The fuel filter according to claim 2, wherein the means mounted on the fuel filter downstream of the water outlet for separating contaminants from water which has been drained from the sump comprises an activated charcoal filter (54).

6. The fuel filter according to claim 3, wherein the means mounted on the fuel filter downstream of the water outlet for separating contaminants from water which has been drained from the sump comprises an activated charcoal filter (54).

7. The fuel filter according to claim 1, wherein the means mounted on the fuel filter downstream of the water outlet for separating contaminants from water which has been drained from the sump comprises a water absorption and evaporation unit, open to the environment.

8. The fuel filter according to claim 7, wherein the water absorption and evaporation unit has an absorbent material.

9. The fuel filter according to claim 8, wherein the material at least partly comprises an absorbent paper.

10. The fuel filter according to claim 8, wherein the material is at least partly spongelike.

11. The fuel filter according to claim 7, wherein the water absorption and evaporation unit has a large evaporation surface area.

12. The fuel filter according to claim 1, further comprising at least one water level sensor, located in the region of the sump (51), for controlling the water outlet.

13. The fuel filter according to claim 12, further comprising two water level sensors.

* * * * *